US009046255B2

(12) United States Patent
Shirai (10) Patent No.: US 9,046,255 B2
(45) Date of Patent: Jun. 2, 2015

(54) ILLUMINATION DEVICE AND DISPLAY DEVICE (75) Inventor: Katsunori Shirai, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 14/117,640

(22) PCT Filed: May 11, 2012

(86) PCT No.: PCT/JP2012/062110
§ 371 (c)(1),
(2), (4) Date: Nov. 14, 2013

(87) PCT Pub. No.: WO2012/157548
PCT Pub. Date: Nov. 22, 2012

(65) Prior Publication Data
US 2014/0085866 A1    Mar. 27, 2014

(30) Foreign Application Priority Data

May 18, 2011    (JP) .................................. 2011-111337

(51) Int. Cl.
*F21V 29/02*    (2006.01)
*F21V 33/00*    (2006.01)
*G02F 1/1335*    (2006.01)

(52) U.S. Cl.
CPC ......... *F21V 29/027* (2013.01); *G02F 1/133603* (2013.01); *G02F 1/133608* (2013.01);
(Continued)

(58) Field of Classification Search
CPC .................... G02F 1/133603; G02F 1/133608; G02F 2001/133612; G02F 2001/133628; G02F 2201/3654; F21V 29/027; F21V 33/0052

USPC ........ 362/97.1, 382, 294, 210, 218, 264, 267, 362/373, 543–544, 580; 165/185
See application file for complete search history.

(56) References Cited

U.S. PATENT DOCUMENTS 5,993,027 A * 11/1999 Yamamoto et al. ............ 362/294
7,438,450 B2 * 10/2008 Aoki et al. ..................... 362/373
(Continued)

FOREIGN PATENT DOCUMENTS

JP    2006-114501 A    4/2006
JP    2007-053078 A    3/2007
(Continued)

OTHER PUBLICATIONS

Official Communication issued in International Patent Application No. PCT/JP2012/062110, mailed on Jul. 31, 2012.

*Primary Examiner* — Anne Hines
*Assistant Examiner* — Jose M Diaz
(74) *Attorney, Agent, or Firm* — Keating & Bennett, LLP (57) ABSTRACT

A backlight unit 20 that radiates light toward a display panel 4 includes LEDs 22, a backlight chassis 21 that includes a rear surface side wall portion 21*a* that supports the LEDs 22, an insulating frame body 24 that forms a space covering a surface of the rear surface side wall portion 21*a* on the side opposite to the side on which the LEDs 22 are supported, a partition portion 24*a* that partitions a space inside the insulating frame body 24 into a plurality of regions, intake ports 24*c* that cause air to flow inside the insulating frame body 24, and exhaust ports 24*d* that cause air inside the insulating frame body 24 to be discharged, the intake ports 24*c* and the exhaust ports 24*d* being provided on the insulating frame body 24 so as to correspond to each of the regions partitioned by the partition portion 24*a*.

8 Claims, 6 Drawing Sheets

(52) U.S. Cl.
CPC .............. *G02F2001/133612* (2013.01); *G02F 2001/133628* (2013.01); *G02F 2201/36* (2013.01); F21V 33/0052 (2013.01); *G02F 2201/54* (2013.01)

(56) References Cited

U.S. PATENT DOCUMENTS

| | | |
|---|---|---|
| 2006/0082271 A1 | 4/2006 | Lee et al. |
| 2008/0304288 A1* | 12/2008 | Iwasaki .................... 362/632 |
| 2009/0147175 A1* | 6/2009 | Tsumura et al. ............ 349/58 |
| 2010/0238394 A1* | 9/2010 | Dunn .......................... 349/161 |
| 2011/0013114 A1* | 1/2011 | Dunn et al. ................. 349/61 |
| 2011/0019363 A1* | 1/2011 | Vahlsing et al. ........... 361/695 |
| 2011/0085342 A1* | 4/2011 | Horng et al. ............... 362/382 |
| 2012/0020114 A1* | 1/2012 | Miyamoto et al. ......... 362/612 |
| 2012/0026432 A1* | 2/2012 | Dunn et al. ................. 349/69 |
| 2012/0206687 A1* | 8/2012 | Dunn et al. ................ 349/161 |
| 2012/0212960 A1* | 8/2012 | Rodriguez ............. 362/249.02 |
| 2012/0223877 A1* | 9/2012 | Cho ............................ 345/102 |
| 2012/0236499 A1* | 9/2012 | Murayama et al. ......... 361/696 |
| 2012/0281161 A1* | 11/2012 | Hubbard ...................... 349/58 |
| 2012/0281167 A1* | 11/2012 | Nakatsuka .................. 349/69 |
| 2013/0301241 A1* | 11/2013 | Maeda ........................ 362/97.1 |

FOREIGN PATENT DOCUMENTS

| | | |
|---|---|---|
| JP | 2007-200750 A | 8/2007 |
| WO | 2009/057443 A1 | 5/2009 |

* cited by examiner

ILLUMINATION DEVICE AND DISPLAY DEVICE

TECHNICAL FIELD

The present invention relates to an illumination device that radiates light toward an object to be irradiated such as, for example, a liquid crystal display panel. The present invention also relates to a display device that includes such an illumination device.

BACKGROUND ART

In general, a liquid crystal display device that is a representative example of a display device requires an illumination device disposed on a side of a liquid crystal display panel that displays images opposite to a display surface of the liquid crystal display panel, that is, the backside of the liquid crystal display panel because the liquid crystal display panel itself does not emit light. The illumination device radiates light toward the liquid crystal display panel that is an object to be irradiated, so that the liquid crystal display device can display images on a screen thereof. Such an illumination device that is to be disposed on the backside of a display surface of a liquid crystal display panel as described above is called, for example, a backlight unit.

For example, a cold-cathode fluorescent lamp and an LED (a light-emitting diode) are well-known examples of a light source used in such a backlight unit. The illumination methods used in such a backlight unit are mainly divided into two types: a direct-type illumination method and an edge-light type illumination method. In a direct backlight unit, a plurality of light sources are disposed directly under a liquid crystal display panel, that is, in a region facing the rear surface of the liquid crystal display panel. In an edge-light backlight unit, a light guide plate having approximately the same size as that of a surface of a liquid crystal display panel is disposed behind the liquid crystal display panel, and a light source is disposed in an edge portion of the light guide plate, so that the light guide plate causes light of the light source having a linear shape to be emitted in a planar form.

PTL 1 discloses an example of such a backlight unit of the related art and an example of such an illumination device of the related art. The backlight device described in PTL 1 includes light sources, a case in which the light sources are to be accommodated, suction ports and suction fans that draw outside air into the case, discharge ports and discharge fans that discharge air in the area inside the case to the outside, and cooling fans that lower the temperature inside the case. A large number of the suction ports and the suction fans, the discharge ports and the discharge fans, and the cooling fans are provided, so that temperature deviation inside the case is minimized, and an increase in the temperature due to the light sources is suppressed.

CITATION LIST

Patent Literature

PTL 1: Japanese Unexamined Patent Application Publication No. 2007-53078 (pp. 5-7, FIG. 2)

SUMMARY OF INVENTION

Technical Problem

There has been a growing demand for a liquid crystal display device that is larger and that has a higher definition than a liquid crystal display device that has hitherto been generally used. Along with this demand, there has also been a demand for a higher output power for a backlight unit in order to realize a luminance similar to that of a liquid crystal display device of the related art. As a result, it is necessary to suppress an increase in the temperature of such a backlight unit and the temperature around the periphery of the backlight unit, and it may be considered to provide ventilators such as a large number of fans as in the backlight device of the related art described in PTL 1. As a result, it can be expected that a high temperature heat is forcibly discharged by causing air to flow on the rear surface side of the backlight unit or the like.

However, in the case where a large number of fans are provided as in the backlight device of the related art described in PTL 1, there is a concern that problems such as an increase in the weight of a backlight unit and an increase in noise may occur. In addition, there is a possibility that a large heat exhaustion effect will not be obtained due to the occurrence of stagnation of air or the like when simply causing air to forcibly flow on the rear surface side of a backlight unit simply by using a large number of fans. Therefore, there is a possibility that a reduction in the service life of a light source caused by heat and an adverse effect on a peripheral electronic component, that is, for example, an electronic component on a control board cannot be avoided.

The present invention has been made in view of the above problems, and it is an object of the present invention to provide an illumination device capable of causing air to effectively flow and discharging heat while suppressing an increase in the weight of the illumination device and an increase in noise as much as possible and capable of realizing stable illumination that can obtain a high luminance even in the case where a plurality of fans are provided in order to suppress an increase in the temperature of the illumination device such as a backlight unit. It is also an object of the present invention to provide a display device that includes such an illumination device.

Solution to Problem

In order to solve the above problems, the present invention provides an illumination device that radiates light toward an object to be irradiated and that includes a light source, a support plate that supports the light source, a frame body that forms a space covering a surface of the support plate on a side of the support plate opposite to a side of the support plate on which the light source is supported, a partition portion that partitions a space inside the frame body into a plurality of regions, and an intake port that allows air to flow in an area inside the frame body and a fan that allows air in the area inside the frame body to be discharged, the intake port and the fan being provided on the frame body in such a manner as to correspond to each of the regions partitioned by the partition portion.

In this configuration, a plurality of air flow paths each of which has a relatively small region and each of which is formed of the frame body and the partition portion are formed on a side of the support plate opposite to the side on which the light source is supported, that is, on the rear surface side of the illumination device with respect to a direction of radiation by the light source. In other words, air flow paths that efficiently discharge heat that is generated on the rear surface side of the illumination device are formed while maximally reducing the number of the fans to be used.

The illumination device having the above configuration further includes a reinforcing member that prevents deformation of the support plate, and at least a part of the frame body or at least a part of the partition portion is formed of the reinforcing member.

In this configuration, the amount of a material that is to be used for forming the frame body and the partition portion is reduced. Therefore, the air flow paths that efficiently discharge the heat generated on the rear surface side of the illumination device are formed while suppressing an increase in the weight of the illumination device.

In addition, the present invention provides a display device that includes the above illumination device.

In this configuration, the air flow paths that efficiently discharge the heat generated on the rear surface side of the illumination device are formed in the display device.

The display device having the above configuration includes a display panel that displays an image, the illumination device that radiates light toward the display panel, and a control board that controls the display panel and the illumination device. The control board is disposed at a position on the illumination device on a side opposite to a side on which the display panel is disposed, and the fan is disposed at a position on the illumination device that is on the side opposite to the side on which the display panel is disposed and that is different from the position at which the control board is disposed.

In this configuration, the heat generated on the rear surface side of the illumination device is discharged outside the frame body without directly hitting the control board.

The display device having the above configuration includes the display panel that displays an image, the illumination device that radiates light toward the display panel, and a control board to which a signal line that is used to control the display panel and the illumination device is connected. The intake port and the signal line are arranged in such a manner as not to face each other.

In this configuration, the signal line is not disposed in the way of air that flows in the area inside the frame body via the intake port. Therefore, the air can smoothly flow in the area inside the frame body via the intake port.

Advantageous Effects of Invention

According to the configuration of the present invention, air flow paths that efficiently discharge heat generated on the rear surface side of an illumination device can be formed while maximally reducing the number of fans to be used and the amount of a material that is to be used for forming a partition portion. Therefore, an illumination device capable of causing air to effectively flow and discharging heat while suppressing an increase in the weight of the illumination device and an increase in noise as much as possible and capable of realizing stable illumination that can obtain a high luminance even in the case where a plurality of fans are provided in order to suppress an increase in the temperature of an illumination device such as a backlight unit can be provided. In addition, a display device that includes such an illumination device can be provided.

DESCRIPTION OF EMBODIMENTS

Embodiments of the present invention will be described below with reference to FIG. 1 to FIG. 6. Note that, in the following description, a liquid crystal display device will be described as an example of a display device according to the present invention that includes a backlight unit that is an example of an illumination device according to the present invention.

Figure 1:
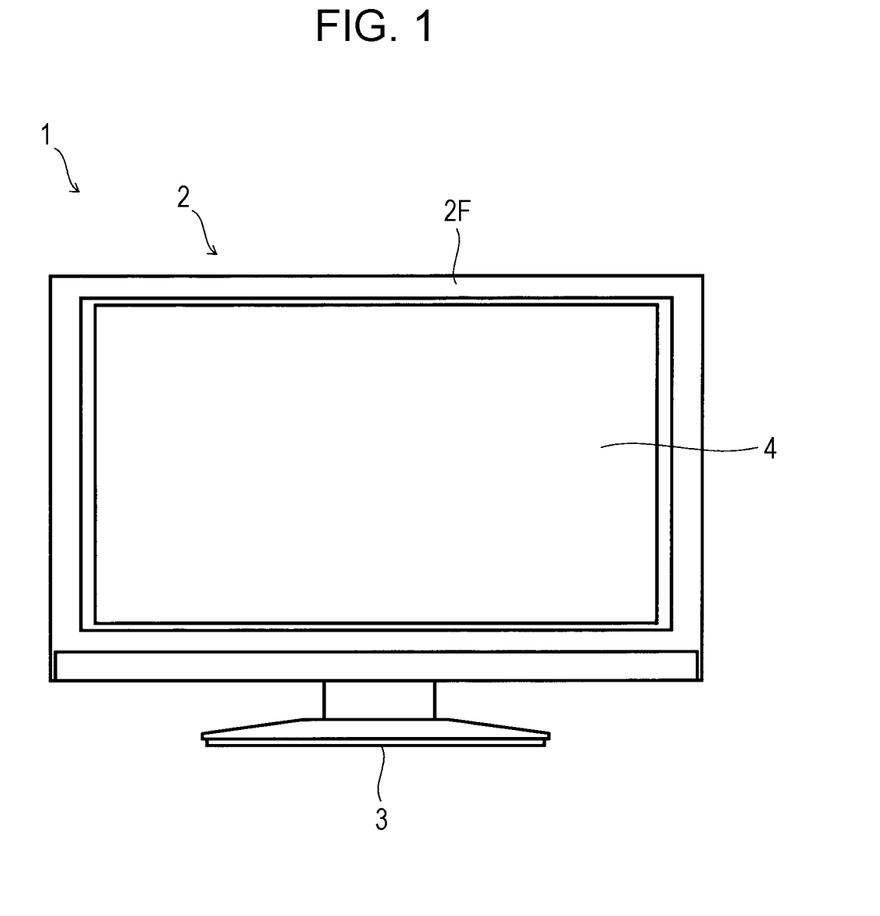
FIG. 1 is a front view of a liquid crystal display device that includes a backlight unit according to a first embodiment of the present invention.
Figure 2:
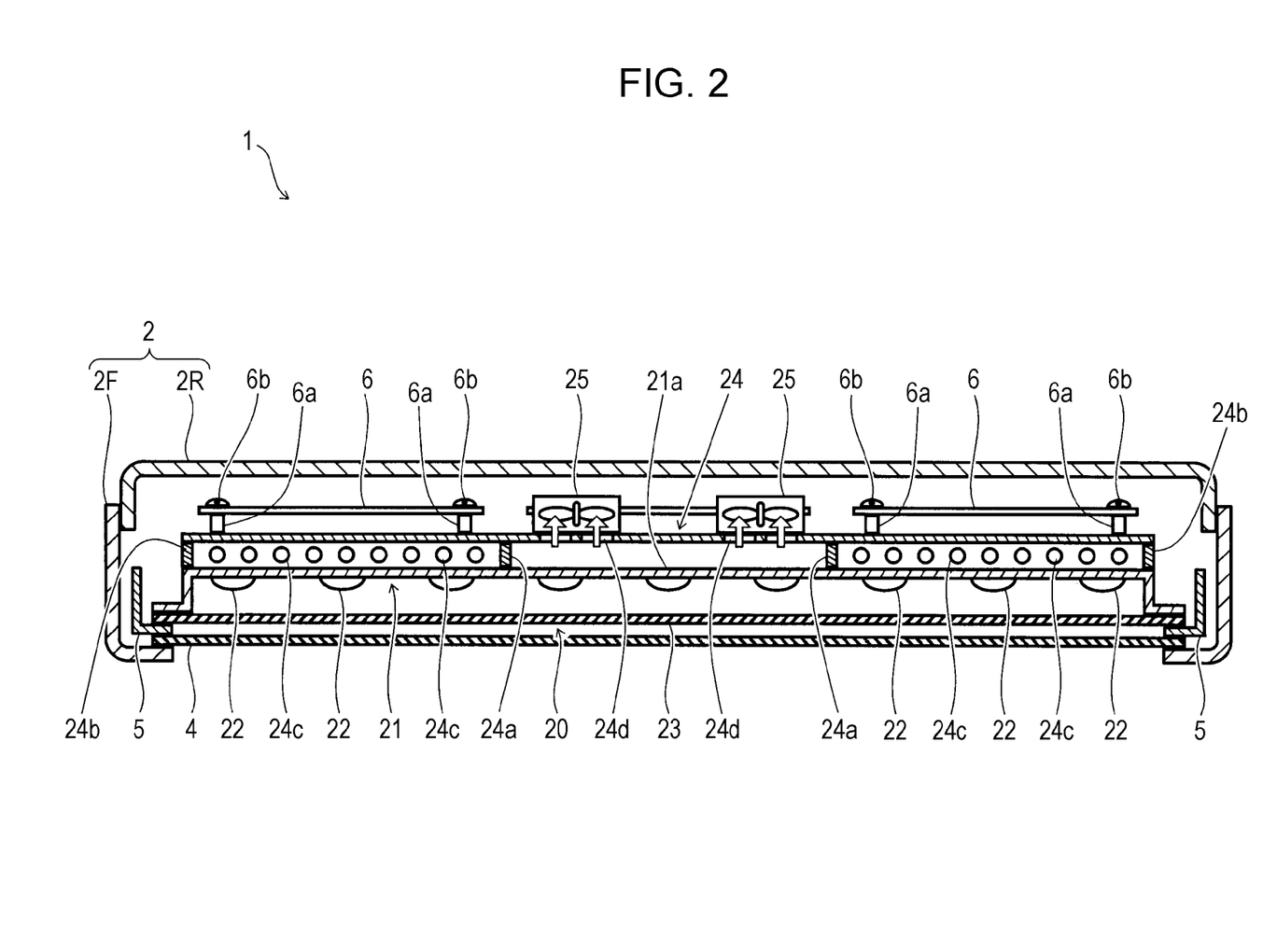
FIG. 2 is a top horizontal sectional view of the liquid crystal display device according to the first embodiment of the present invention.
Figure 3:
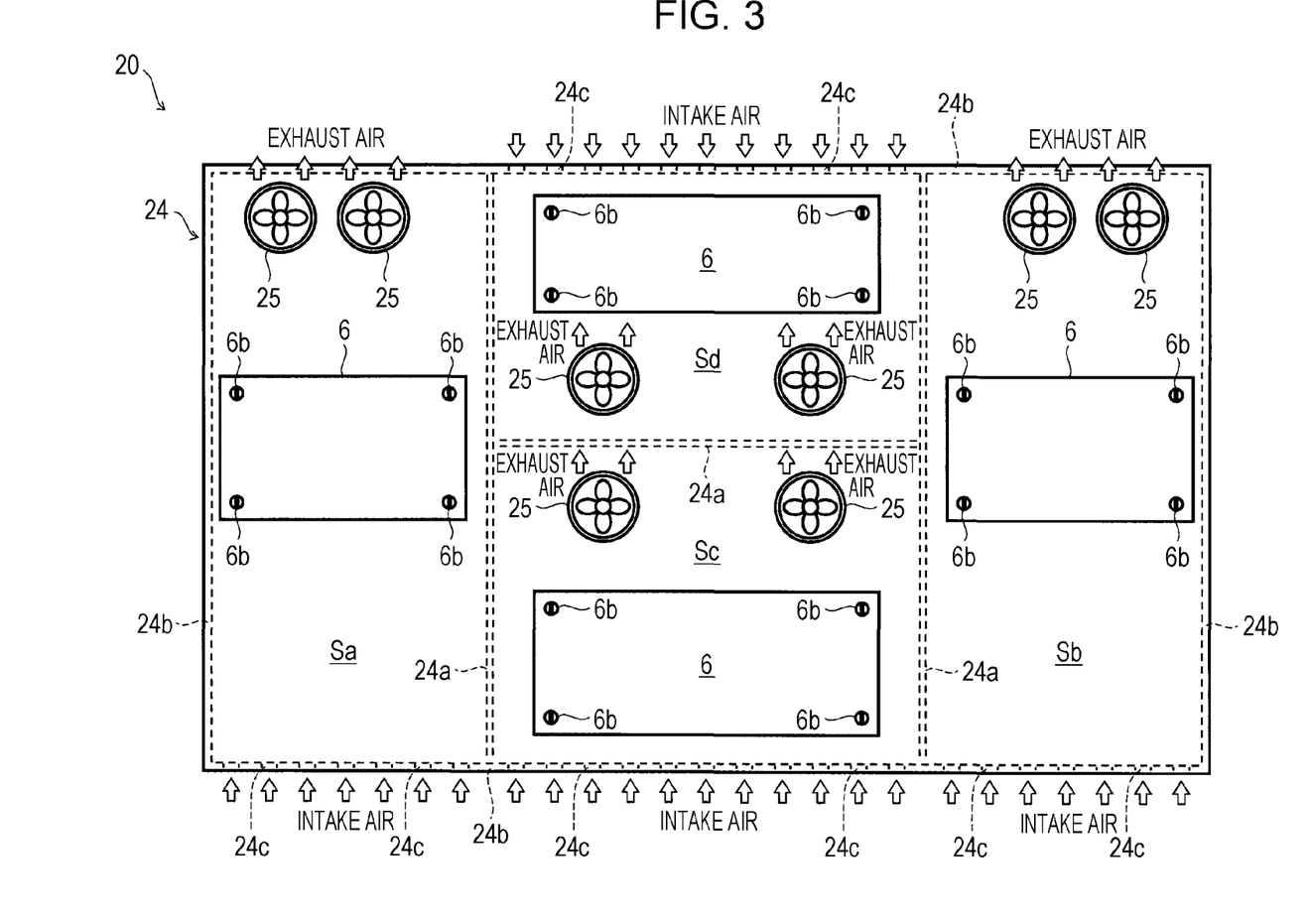
FIG. 3 is a rear view of the backlight unit and control boards of the liquid crystal display device according to the first embodiment of the present invention.
Figure 4:
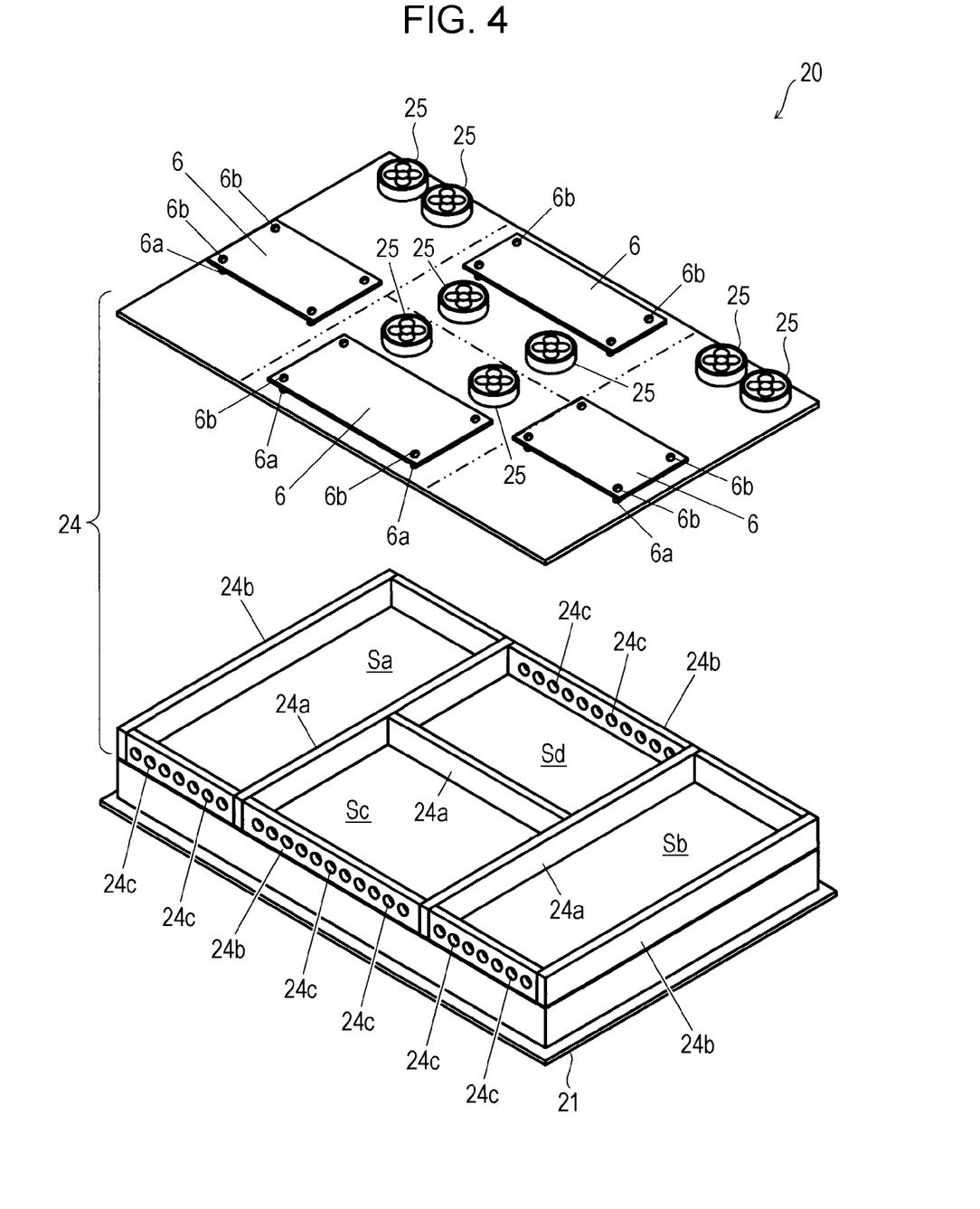
FIG. 4 is a perspective view of the backlight unit and the control boards of the liquid crystal display device according to the first embodiment of the present invention as viewed from the rear surface side and illustrates an exploded state of an insulating frame body.

First, the structure of a liquid crystal display device that includes a backlight unit according to a first embodiment of the present invention will be described with reference to FIG. 1 to FIG. 4. FIG. 1 is a front view of the liquid crystal display device, FIG. 2 is a top horizontal sectional view of the liquid crystal display device, FIG. 3 is a rear view of the backlight unit and control boards, and FIG. 4 is a perspective view of the backlight unit and control boards as viewed from the rear surface side and illustrates an exploded state of the insulating frame body. Hollow arrows illustrated in FIG. 2 and FIG. 3 indicate circulation directions of air flows generated by fans. Note that, in the description, the terms "forward" and "rearward" refer to a case in which a member or a portion is positioned at the front surface side of the liquid crystal display device with respect to another member or another portion and a case in which a member or a portion is positioned at the rear surface side of the liquid crystal display device with respect to another member or another portion, respectively.

A liquid crystal display device 1 is a display device that uses liquid crystal in order to display images and has a substantially rectangular shape in plan view (a rectangular shape) extending long in the left-right direction as illustrated in FIG. 1 and FIG. 2. The liquid crystal display device 1 includes an exterior cover 2 that is a housing having the shape of a flat rectangular box. The exterior cover 2 is horizontally long and is supported by a stand 3 while kept in an upright posture.

The exterior cover 2 includes a front cover 2F and a rear cover 2R. The front cover 2F is configured in such a manner as to have a so-called picture frame shape in which a rectangular opening is formed on the front surface side. The rear cover 2R is fitted to the front cover 2F in such a manner as to cover the rear surface side of the front cover 2F, so that the exterior cover 2 having a rectangular box shape is formed. Note that, a plurality of vents are formed in the exterior cover 2 in such a manner as to extend therethrough between an area inside the exterior cover 2 and an area outside the exterior cover 2 although the vents are not illustrated in the drawings, and air can freely circulate between the area inside the exterior cover 2 and the area outside the exterior cover 2 via the vents.

As illustrated in FIG. 2, a liquid crystal display panel 4, a panel holder 5, a backlight unit 20, and control boards 6 are disposed in the area inside the exterior cover 2.

The liquid crystal display panel 4 has the shape of a rectangular plate and is disposed in an area immediately inside the front opening of the front cover 2F. The liquid crystal display panel 4 includes an active matrix substrate, a counter substrate (a color filter substrate), and a polarizing sheet each of which has a rectangular shape and each of which is not illustrated in the drawings. These substrates and sheet are joined together in such a manner that, for example, predetermined surfaces of the substrates and sheet face one another and have a seal member (not illustrated) disposed therebetween. The active matrix substrate includes a pixel electrode on the predetermined surface thereof. The counter substrate includes a common electrode on the predetermined surface thereof. In addition, liquid crystal is enclosed between the active matrix substrate and the counter substrate. On the basis of a video signal, the liquid crystal display panel 4 adjusts the orientation of the liquid crystal by using an electric field generated between the pixel electrode of the active matrix substrate and the common electrode of the counter substrate and changes the transmittance of light that is transmitted through the liquid crystal.

The panel holder 5 is disposed on the rear surface side of a circumferential edge portion of the liquid crystal display panel 4. The panel holder 5 has the shape of a rectangular picture frame that is small enough to be fitted into an area inside the front cover 2F and has an opening that is similar to the front opening of the front cover 2F inside thereof. The liquid crystal display panel 4 is clamped between the panel holder 5 and the inner surface of the front cover 2F. Light from the backlight unit 20 irradiates the liquid crystal display panel 4 via the opening of the panel holder 5.

The backlight unit 20 is disposed in a rearward position with respect to the entire rear surface of the liquid crystal display panel 4. The backlight unit 20 is an illumination device that employs a direct illumination method and includes a backlight chassis 21, LEDs 22, an optical sheet group 23, an insulating frame body 24, and exhaust fans 25.

The backlight chassis 21 is formed in a box shape that is substantially rectangular in plan view and that is open on the side of the liquid crystal display panel 4. A plurality of the LEDs 22 each of which serves as a light source are accommodated in an area inside the backlight chassis 21, that is, on the inner surface of a rear surface side wall portion 21a of the backlight chassis 21. The rear surface side wall portion 21a of the backlight chassis 21 functions as a support plate that supports the plurality of LEDs 22.

Each of the LEDs 22 is a light source that emits light for generating backlight for the liquid crystal display panel 4 and is formed of, for example, a white LED (a light-emitting diode) that emits white light. Each of the LEDs 22 has, for example, a block shape having a size of 3 mm to 8 mm, and the LEDs 22 are arranged in rows forming a substantially grid-like pattern on the entire inner surface of the rear surface side wall portion 21a of the backlight chassis 21. The pitch of the plurality of LEDs 22 is set to, for example, 30 mm. Note that light sources are not limited to LEDs, and also the LEDs are not limited to LEDs that emit white light. In addition, the number of the LEDs 22 and a method of arranging the LEDs 22 are not limited to the above or those illustrated in FIG. 2.

The optical sheet group 23 includes a diffuser panel, a prism sheet, and a lens sheet each of which is not illustrated in the drawings. The optical sheet group 23 is disposed on the front surface side of the backlight chassis 21 in such a manner as to block the front opening of the backlight chassis 21 and covers a region in which the plurality of LEDs 22 are arranged from the side of the liquid crystal display panel 4. The diffuser panel directly receives light emitted from the LEDs 22 and diffuses the light in such a manner that the light is distributed over the entirety of the liquid crystal display panel 4. The prism sheet deflects the emission characteristics of light received from the diffuser panel. The lens sheet reduces differences between brightness of the light, which has been received by the prism sheet, that cause unevenness in light intensity.

The insulating frame body 24 is disposed in the rear of the backlight chassis 21. The insulating frame body 24 has a size sufficient to cover the entire outer surface of the rear surface side wall portion 21a of the backlight chassis 21 and is formed in a box shape that is substantially rectangular in plan view and that is open on the side of the backlight chassis 21. The insulating frame body 24 forms a space that covers the entire outer surface of the rear surface side wall portion 21a of the backlight chassis 21.

The insulating frame body 24 is formed of, for example, a heat insulating member that is made of a synthetic resin having a relatively high heat-insulation efficiency or the like. Note that a different heat insulating material such as glass wool or polyethylene resin foam may be provided by attaching the heat insulating material on the inner side of the rear surface of the insulating frame body 24.

In addition, as illustrated in FIG. 2 to FIG. 4, the insulating frame body 24 includes a partition portion 24a in the interior thereof. The partition portion 24a partitions a space inside the insulating frame body 24 into four regions Sa, Sb, Sc, and Sd. As illustrated in FIG. 3, as viewed from the rear surface side of the insulating frame body 24, the regions Sa and Sb are formed in the left and right end portions of the insulating frame body 24 and are relatively long extending from the lower end of the insulating frame body 24 to the upper end of the insulating frame body 24. The regions Sc and Sd are formed between the regions Sa and Sb and formed in a center portion of the insulating frame body 24 in the left-right direction. Among two regions that are partitioned in the top-bottom direction, a lower region is the region Sc, and an upper region is the region Sd. Note that circumferential edge portions 24b of the insulating frame body 24 that are portions extending rearward with respect to the backlight chassis 21 and the entirety or a part of the partition portion 24a may be formed of reinforcing members that prevent deformation of the rear surface side wall portion 21a of the backlight chassis 21.

As illustrated in FIG. 2 to FIG. 4, the insulating frame body 24 includes a plurality of intake ports 24c in the circumferential edge portions 24b on the upper and lower sides thereof. The intake ports 24c extend through the insulating frame body 24 in the top-bottom direction with respect to an area inside the insulating frame body 24 and an area outside the insulating frame body 24 and can cause air outside the insulating frame body 24 to flow in an area inside the insulating frame body 24. In addition, as illustrated in FIG. 2, the insulating frame body 24 includes exhaust ports 24d at a plurality of positions in the rear surface thereof. The exhaust ports 24d extend through the insulating frame body 24 in the front-rear direction with respect to the area inside the insulating frame body 24 and the area outside the insulating frame body 24 and can cause air in the area inside the insulating frame body 24 to be discharged to the outside.

The exhaust fans 25 are formed of, for example, axial flow fans and are disposed at positions on the rear of the insulating frame body 24 corresponding to the positions of the exhaust ports 24d of the insulating frame body 24 as illustrated in FIG. 2 to FIG. 4. The exhaust fans 25 cover the exhaust ports 24d of the insulating frame body 24 and can cause the air in the area inside the insulating frame body 24 to be forcibly discharged to the outside via the exhaust ports 24d. Although the exhaust ports 24d cannot be seen in FIG. 3 and FIG. 4 because the exhaust ports 24d are covered with the exhaust fans 25, the exhaust ports 24d are formed at positions that correspond to the positions of the exhaust fans 25 provided on the rear surface of the insulating frame body 24.

Note that the intake ports 24c, the exhaust ports 24d, and the exhaust fans 25 are provided in such a manner as to correspond to each of the regions Sa, Sb, Sc, and Sd, which are partitioned by the partition portion 24a. For example, in the regions Sa, Sb, and Sc, the intake ports 24c that allow air to flow upward are disposed on the lower end, and the exhaust ports 24d and the exhaust fans 25 that allow air to be discharged rearward are disposed at two positions in an upper portion, so that air flow in an upward direction is generated by the exhaust fans 25. On the other hand, in the region Sd, the intake ports 24c that allow air to flow downward are disposed on the upper end, and the exhaust ports 24d and the exhaust fans 25 that allow air to be discharged rearward are disposed at two positions in a lower portion, so that air flow in a downward direction is generated by the exhaust fans 25.

The backlight unit 20 having such a configuration radiates backlight that is uniform and has no unevenness in a planar form and illuminates the rear surface of the liquid crystal display panel 4. Since the liquid crystal display panel 4 changes the transmittance of the backlight that is transmitted through the liquid crystal on the basis of a video signal, a desired image is displayed on a display screen of the liquid crystal display panel 4.

As illustrated in FIG. 2 to FIG. 4, the control boards 6 are disposed at positions on the side of the backlight unit 20 opposite to the side on which the display panel 4 is disposed, that is, behind the insulating frame body 24 of the backlight unit 20. The number of the control boards 6 that are provided is, for example, four, and each of the control boards 6 is fixed to the rear surface of the insulating frame body 24 with a screw 6b with a spacer 6a therebetween in such a manner that there is an interval between the control board 6 and the rear surface of the insulating frame body 24. The control boards 6 have functions of an LCD controller (control of the display panel 4), an LED controller (control of the backlight unit 20), a video controller, and the like. Note that, in FIG. 2 to FIG. 4, and in addition, in FIG. 5 that will be described later, signal lines that extend from the control boards 6 and that are electrically connected to the display panel 4, the backlight unit 20, and the like in order to control the display panel 4 and the backlight unit 20 are not illustrated.

Here, as illustrated in FIG. 3 and FIG. 4, the exhaust fans 25 are disposed at positions behind the insulating frame body 24, the positions being different from the positions at which the control boards 6 are disposed. In other words, air outlet ports of the exhaust fans 25 and the control boards 6 are not facing one another.

As described above, the liquid crystal display device 1 includes the insulating frame body 24 that forms a space that covers a surface of the rear surface side wall portion 21a of the backlight chassis 21, which is a support plate of the LEDs 22, on the side opposite to the side on which the LEDs 22 are supported, that is, the rear surface of the backlight chassis 21, the partition portion 24a that partitions the space inside the insulating frame body 24 into a plurality of regions, the intake ports 24c that allow air to flow in the area inside the insulating frame body 24, and the exhaust fans 25 that allow air in the area inside the insulating frame body 24 to be discharged, the insulating frame body 24 and the exhaust fans 25 being disposed in such a manner as to correspond to each of the regions partitioned by the partition portion 24a. As a result, a plurality of air flow paths each of which has a relatively small region and each of which is formed of the insulating frame body 24 and the partition portion 24a are formed on the rear surface side of the backlight unit 20. In other words, air flow paths that efficiently discharge heat that is generated on the rear surface side of the backlight unit 20 can be formed while maximally reducing the number of the exhaust fans 25 to be used.

In addition, by forming a part of the insulating frame body 24 or a part of the partition portion 24a of a reinforcing member that prevents deformation of the rear surface side wall portion 21a of the backlight chassis 21, the amount of a material that is to be used for forming the insulating frame body 24 and the partition portion 24a is reduced. Therefore, the air flow paths, which efficiently discharge the heat generated on the rear surface side of the backlight unit 20, can be formed while suppressing an increase in the weight of the backlight unit 20.

In the liquid crystal display device 1, the control boards 6 are disposed at positions on the backlight unit 20 on the side opposite to the side on which the display panel 4 is disposed, and the exhaust fans 25 are disposed at positions on the backlight unit 20 on the side opposite to the side on which the display panel 4 is disposed, and these positions being different from the positions at which the control boards 6 are disposed. As a result, the heat generated on the rear surface side of the backlight unit 20 is discharged outside the insulating frame body 24 without directly hitting the control boards 6. Therefore, the transfer of the heat generated on the rear surface side of the backlight unit 20 onto the control boards 6 can be suppressed.

According to the above embodiment of the present invention, the air flow paths, which efficiently discharge the heat generated on the rear surface side of the backlight unit 20, can be formed while maximally reducing the number of the exhaust fans 25 to be used and the amount of the material used for forming the partition portion 24a. Therefore, the backlight unit 20 capable of causing air to effectively flow and discharging heat while suppressing an increase in the weight of the backlight unit 20 and an increase in noise as much as possible and capable of realizing stable illumination that can obtain a high luminance even in the case where the plurality of exhaust fans 25 are provided in order to suppress an increase in the temperature of the backlight unit 20 can be provided. In addition, the liquid crystal display device 1 that includes the backlight unit 20 can be provided.

Figure 5:
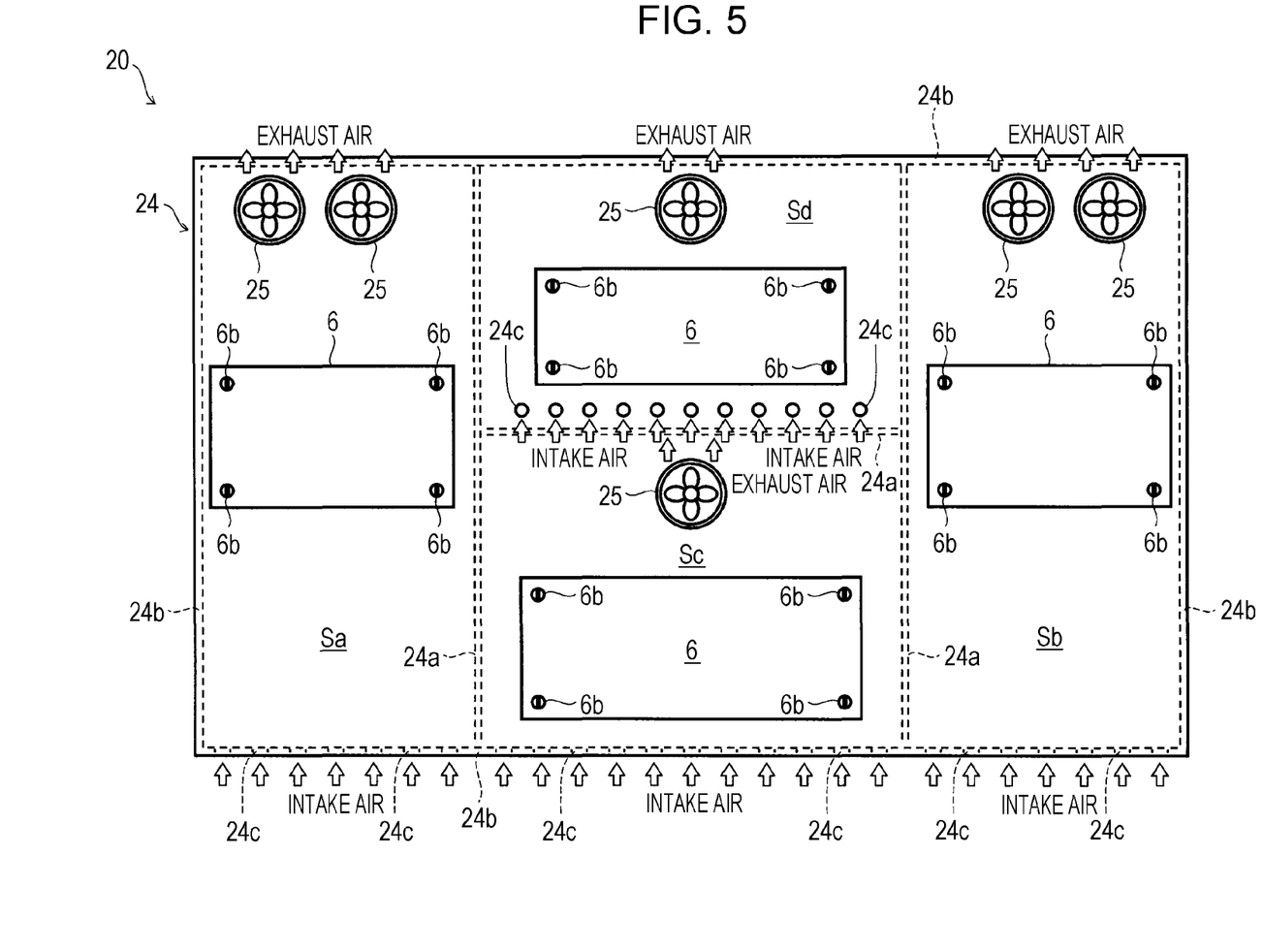
FIG. 5 is a rear view of a backlight unit and control boards of a liquid crystal display device according to a second embodiment of the present invention.

Next, a liquid crystal display device according to a second embodiment of the present invention will be described with reference to FIG. 5. FIG. 5 is a rear view of a backlight unit and control boards of the liquid crystal display device. Note that the basic configuration of this embodiment is the same as that of the first embodiment, which has been described with reference to FIG. 1 to FIG. 4. Thus, components that are common with the first embodiment are denoted by the same reference numerals, and illustration thereof in the drawing and descriptions thereof will be omitted. Regarding this, the exhaust ports 24d of the insulating frame body 24 in FIG. 5 are covered with the exhaust fans 25 and cannot be seen when the backlight unit 20 is viewed from the rear surface side. Hollow arrows illustrated in FIG. 5 indicate circulation directions of air flows generated by fans.

As illustrated in FIG. 5, in the backlight unit 20 according to the second embodiment, the partition portion 24a partitions a space inside the insulating frame body 24 into four regions Sa, Sb, Sc, and Sd. As illustrated in FIG. 5, as viewed from the rear surface side of the insulating frame body 24, the regions Sa and Sb are formed in the left and right end portions of the insulating frame body 24 and are relatively long extending from the lower end of the insulating frame body 24 to the upper end of the insulating frame body 24. The regions Sc and Sd are formed between the regions Sa and Sb and formed in a center portion of the insulating frame body 24 in the left-right direction. Among two regions that are partitioned in the top-bottom direction, a lower region is the region Sc, and an upper region is the region Sd.

In the regions Sa, Sb, and Sc, the intake ports 24c that allow air to flow upward are disposed on the lower end, and the exhaust ports 24d and the exhaust fans 25 that allow air to be discharged rearward are disposed in an upper portion. In the region Sd, the intake ports 24c that allow air to flow forward are disposed in a lower portion of the rear surface of the insulating frame body 24, and the exhaust ports 24d and the exhaust fans 25 that allow air to be discharged rearward are disposed in an upper portion. In other words, in all of the regions Sa, Sb, Sc, and Sd, air flow in an upward direction is generated by the exhaust fans 25.

Since air having a relatively high temperature due to the heat generated on the rear surface side of the backlight unit 20 moves upward, in the configuration, the heat can be discharged through natural air flow in the upward direction in the entire space inside the insulating frame body 24. Therefore, the heat generated on the rear surface side of the backlight unit 20 can be further effectively discharged.

Figure 6:
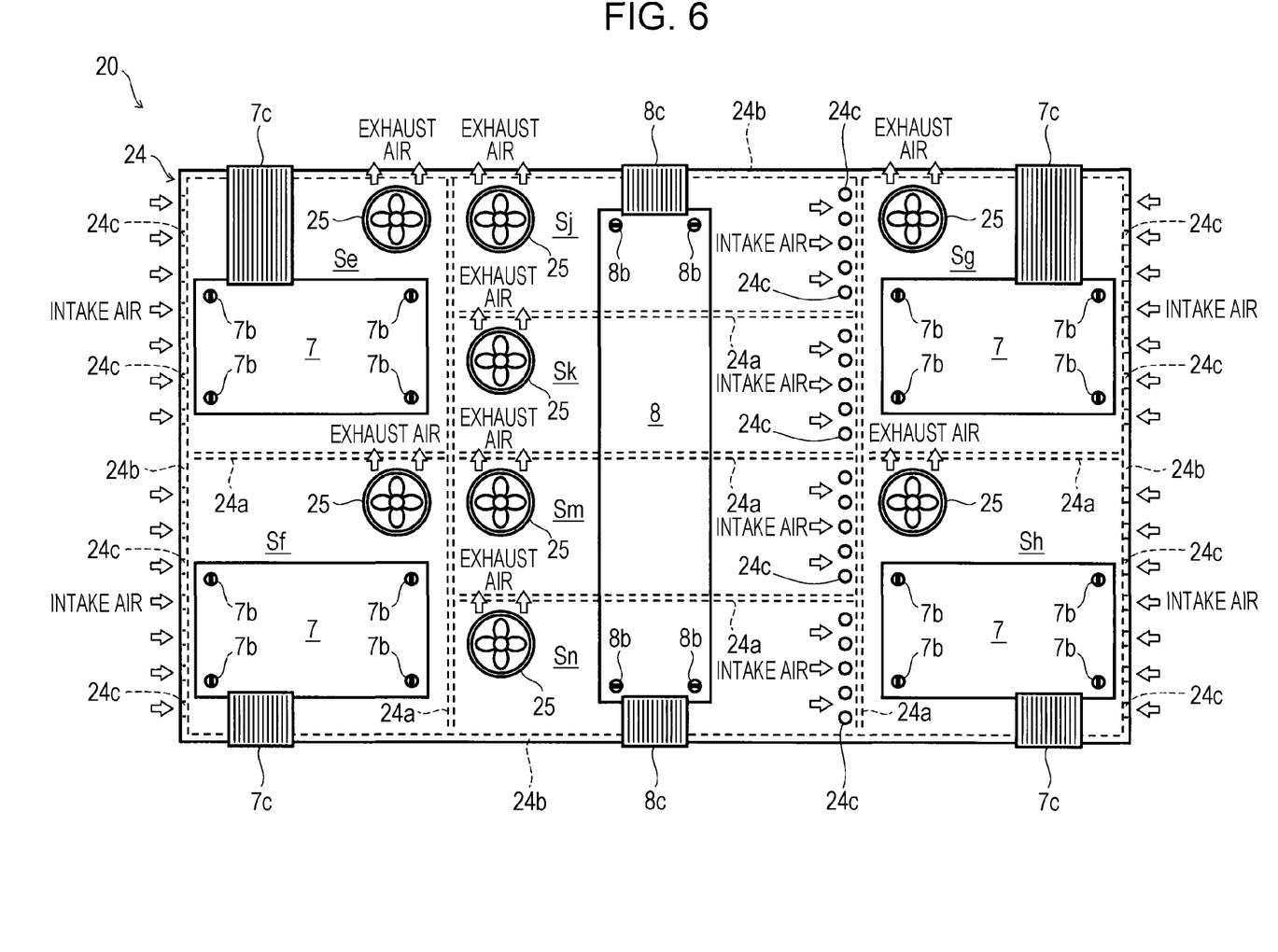
FIG. 6 is a rear view of a backlight unit and control boards of a liquid crystal display device according to a third embodiment of the present invention.

Next, a liquid crystal display device according to a third embodiment of the present invention will be described with reference to FIG. 6. FIG. 6 is a rear view of a backlight unit and control boards of the liquid crystal display device. Note that the basic configuration of this embodiment is the same as that of the first embodiment, which has been described with reference to FIG. 1 to FIG. 4. Thus, components that are common with the first embodiment are denoted by the same reference numerals, and illustration thereof in the drawing and descriptions thereof will be omitted. Regarding this, the exhaust ports 24d of the insulating frame body 24 in FIG. 6 are covered with the exhaust fans 25 and cannot be seen when the backlight unit 20 is viewed from the rear surface side. Hollow arrows illustrated in FIG. 6 indicate circulation directions of air flows generated by fans.

As illustrated in FIG. 6, in the backlight unit 20 according to the third embodiment, the partition portion 24a partitions a space inside the insulating frame body 24 into eight regions Se, Sf, Sg, Sh, Sj, Sk, Sm, and Sn. As illustrated in FIG. 6, as viewed from the rear surface side of the insulating frame body 24, the regions Se and Sf are formed in the left end portion of the insulating frame body 24, and among two regions that are partitioned in the top-bottom direction, an upper region is the region Se, and a lower region is the region Sf. The regions Sg and Sh are formed in the right end portion of the insulating frame body 24, and among two regions that are partitioned in the top-bottom direction, an upper region is the region Sg, and a lower region is the region Sf. The regions Sj, Sk, Sm, and Sn are formed between the regions Se and Sf and the regions Sg and Sh and formed in a center portion of the insulating frame body 24 in the left-right direction. Four regions that are partitioned in the top-bottom direction are the regions Sj, Sk, Sm, and Sn in descending order.

As illustrated in FIG. 6, as viewed from the rear surface side, in the regions Se and Sf, the intake ports 24c that allow air to flow rightward are disposed on the left end, and the exhaust ports 24d and the exhaust fans 25 that allow air to be discharged rearward are disposed at one position on the right side, so that air flow in the rightward direction is generated by the exhaust fans 25. In the regions Sg and Sh, the intake ports 24c that allow air to flow leftward are disposed on the right end, and the exhaust ports 24d and the exhaust fans 25 that allow air to be discharged rearward are disposed at one position on the left side, so that air flow in the leftward direction is generated by the exhaust fans 25. In the regions Sj, Sk, Sm, and Sn, the intake ports 24c that allow air to flow forward are disposed on the right side as viewed from the rear surface side of the insulating frame body 24, and the exhaust ports 24d and the exhaust fans 25 that allow air to be discharged rearward are disposed at one position on the left side, so that air flow in the leftward direction is generated by the exhaust fans 25.

Control boards 7 and 8 are disposed at positions on the backlight unit 20 on the side opposite to the side on which the display panel 4 is disposed, that is, in the rear of the insulating frame body 24 of the backlight unit 20. The number of the control boards 7 that are provided is, for example, four, and each of the control boards 7 is fixed to the rear surface of the insulating frame body 24 corresponding to each of the regions Se, Sf, Sg, and Sh with a screw 7b with a spacer (not illustrated) therebetween in such a manner that there is an interval between the control board 7 and the rear surface of the insulating frame body 24. The number of the control boards 8 that are provided is, for example, one, and the control board 8 is fixed to the rear surface of the insulating frame body 24 with a screw 8b with a spacer (not illustrated) therebetween in such a manner as to extend over the regions Sj, Sk, Sm, and Sn in the top-bottom direction and in such a manner that there is an interval between the control board 8 and the rear surface of the insulating frame body 24.

In order to control the display panel 4 and the backlight unit 20, signal lines 7c and 8c that extend from the control boards 7 and 8 and that are electrically connected to the display panel 4, the backlight unit 20, and the like are provided. The signal lines 7c and 8c extend toward the display panel 4 and the backlight unit 20 via the upper side or the lower side of the insulating frame body 24. As described above, the intake ports 24c disposed at the left end, the right end, and on the rear surface of the insulating frame body 24 and the signal lines 7c and 8c are disposed in such a manner as not to face one another. As a result, the signal lines 7c and 8c are not disposed in the way of air that flows in the area inside the insulating frame body 24 via the intake ports 24c. Therefore, the air can smoothly flow in the area inside the insulating frame body 24 via the intake ports 24c.

Although the embodiments of the present invention have been described above, the scope of the present invention is not limited to the above embodiments, and various modifications can be made within the gist of the present invention.

For example, a method of partitioning the space inside the insulating frame body 24 by the partition portion 24a and the number of the regions that are partitioned are not limited to the partitioning method and the number of regions that have been described in the above embodiments, and a different partitioning method and a different number of regions may be employed. In addition, the positions at which the intake ports 24c, the exhaust ports 24d, and the exhaust fans 25 are arranged and the numbers of the intake ports 24c, the exhaust ports 24d, and the exhaust fans 25 are not limited to the positions and the numbers that have been described in the above embodiments, and different positions and different numbers may be employed.

In addition, the positions at which the control boards 7 and 8 are arranged with respect to the rear surface of the insulating frame body 24 and the numbers of the control boards 7 and 8 are not limited to the positions and the numbers that have been described in the above embodiments, and different positions and different numbers may be employed.

INDUSTRIAL APPLICABILITY

The present invention can be applied to an illumination device that radiates light toward an object to be irradiated such as a liquid crystal display panel.

REFERENCE SIGNS LIST 1 liquid crystal display device (display device)
2 exterior cover
4 liquid crystal display panel (display panel)
6, 7, 8 control board
7c, 8c signal line
20 backlight unit (illumination device)
21 backlight chassis
21a rear surface side wall portion (support plate)
22 LED (light source)
24 insulating frame body (frame body)
24a partition portion
24b circumferential edge portion
24c intake port
24d exhaust port
25 exhaust fan

The invention claimed is:

1. An illumination device that radiates light toward an object to be irradiated comprising:
    a plurality of light sources;
    a support plate configured to support the plurality of light sources;
    a frame body configured to define a space covering a surface of the support plate on a side of the support plate opposite to a side of the support plate on which the plurality of light sources are provided;
    a partition portion configured to partition a space inside the frame body and directly beneath the plurality of light sources into a plurality of regions; and
    an intake port configured to allow air to flow in an area inside the frame body and a fan configured to allow air in the area inside the frame body to be discharged, the intake port and the fan being provided on the frame body in such a manner as to correspond to each of the regions partitioned by the partition portion, wherein
    the plurality of light sources are provided on an entirety of a planar region directly opposing a rear surface of an object to be irradiated, and
    the object to be irradiated emits light from a front surface directly opposed to the rear surface of the object to be irradiated.

2. The illumination device according to claim 1, further comprising:
    a reinforcing member configured to prevent deformation of the support plate,
    wherein at least a part of the frame body or at least a part of the partition portion is formed of the reinforcing member.

3. A display device comprising:
    the illumination device according to claim 1.

4. The display device according to claim 3 comprising:
    a display panel configured to display an image;
    the illumination device configured to radiate light toward the display panel; and
    a control board configured to control the display panel and the illumination device,
    wherein the control board is disposed at a position on the illumination device on a side opposite to a side on which the display panel is disposed, and
    wherein the fan is disposed at a position on the illumination device that is on the side opposite to the side on which the display panel is disposed and that is different from the position at which the control board is disposed.

5. The display device according to claim 3 comprising:
    a display panel configured to display an image;
    the illumination device configured to radiate light toward the display panel; and
    a control board to which a signal line that is used to control the display panel and the illumination device is connected,
    wherein the intake port and the signal line are arranged in such a manner as not to face each other.

6. A display device comprising:
    the illumination device according to claim 2.

7. The display device according to claim 4 comprising:
    a display panel configured to display an image;
    the illumination device configured to radiate light toward the display panel; and
    a control board to which a signal line that is used to control the display panel and the illumination device is connected,
    wherein the intake port and the signal line are arranged in such a manner as not to face each other.

8. The display device according to claim 1, further comprising:
    a plurality of fans each of which is provided to a respective one of the plurality of regions partitioned by the partition portion.

* * * * *